US009829708B1

(12) United States Patent
Asada

(10) Patent No.: US 9,829,708 B1
(45) Date of Patent: Nov. 28, 2017

(54) METHOD AND APPARATUS OF WEARABLE EYE POINTING SYSTEM

(71) Applicant: Boston Incubator Center, LLC, Waltham, MA (US)

(72) Inventor: Haruhiko Harry Asada, Lincoln, MA (US)

(73) Assignee: Boston Incubator Center, LLC, Waltham, MA (US)

( * ) Notice: Subject to any disclaimer, the term of this patent is extended or adjusted under 35 U.S.C. 154(b) by 19 days.

(21) Appl. No.: 14/830,432

(22) Filed: Aug. 19, 2015

Related U.S. Application Data

(60) Provisional application No. 62/039,071, filed on Aug. 19, 2014.

(51) Int. Cl.
```
G06F 3/0484    (2013.01)
G06F 3/0482    (2013.01)
G06F 3/01      (2006.01)
G02B 27/01     (2006.01)
G02B 27/00     (2006.01)
G06F 1/26      (2006.01)
```
(52) U.S. Cl.
CPC ..... *G02B 27/0172* (2013.01); *G02B 27/0093* (2013.01); *G06F 1/26* (2013.01); *G06F 3/012* (2013.01); *G06F 3/013* (2013.01); *G06F 3/017* (2013.01); *G06F 3/0482* (2013.01); *G06F 3/04842* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| 7,259,785 B2 * | 8/2007 | Stavely | A61B 3/113 348/231.3 |
| 7,736,000 B2 * | 6/2010 | Enriquez | A61B 3/113 351/205 |
| 8,736,692 B1 * | 5/2014 | Wong | G06F 3/013 348/208.4 |

(Continued)

OTHER PUBLICATIONS

Nonaka, Hidetoshi, "Communication Interface with Eye-Gaze and Head Gesture Using Successive DP Matching and Fuzzy Inference," Journal of Intelligent Information Systems, 21:2, 105-112, 2003.

*Primary Examiner* — Antonio Xavier
(74) *Attorney, Agent, or Firm* — Spano Law Group; Joseph S. Spano

(57) ABSTRACT

Methods and systems for providing a reliable hands-free interface between a user and a computing device are presented herein. The interface system includes a gaze tracking system, display system, and head motion tracking system all attached to a frame that is mountable to the head of a user. Eye movements are tracked to determine when the gaze of a user has settled on a particular image displayed by the display system. After a fixed gaze has been identified, it is determined whether the user is moving his/her head in a confirmatory head gesture. The user selection is verified by determining whether the gaze of the user remains fixed to the selected image while executing the confirmatory gesture. This ensures that the gaze of the user remains focused on the selected image projected by the display, rather than an object in the surrounding environment.

20 Claims, 4 Drawing Sheets

(56) References Cited

U.S. PATENT DOCUMENTS

| | | | |
|---|---|---|---|
| 9,069,164 B2 | 6/2015 | Starner et al. | |
| 2009/0284552 A1* | 11/2009 | Larson | G02B 27/01 345/632 |
| 2012/0154557 A1* | 6/2012 | Perez | H04N 21/25891 348/53 |
| 2013/0114850 A1* | 5/2013 | Publicover | G06K 9/00604 382/103 |
| 2013/0241805 A1* | 9/2013 | Gomez | G09G 3/003 345/8 |
| 2013/0278631 A1* | 10/2013 | Border | G02B 27/017 345/633 |
| 2015/0135132 A1* | 5/2015 | Josephson | G06F 3/0482 715/784 |
| 2015/0169050 A1* | 6/2015 | Publicover | G06K 9/00604 345/156 |
| 2015/0177834 A1* | 6/2015 | Karakotsios | G06F 3/013 345/156 |
| 2015/0192991 A1* | 7/2015 | Dal Mutto | G06F 3/0482 715/747 |
| 2016/0029945 A1* | 2/2016 | Merfeld | A61B 5/4023 600/558 |
| 2016/0109961 A1* | 4/2016 | Parshionikar | G06F 3/013 345/156 |
| 2016/0262608 A1* | 9/2016 | Krueger | A61B 3/0041 |
| 2016/0274660 A1* | 9/2016 | Publicover | H04N 5/23229 |
| 2016/0286210 A1* | 9/2016 | Border | G02B 27/0176 |

\* cited by examiner

METHOD AND APPARATUS OF WEARABLE EYE POINTING SYSTEM

CROSS REFERENCE TO RELATED APPLICATIONS

The present application for patent claims priority under 35 U.S.C. §119 from U.S. provisional patent application Ser. No. 62/039,071, entitled "Method and Apparatus of Wearable Eye Pointing System," filed Aug. 19, 2014, the entire subject matter of which is incorporated herein by reference.

TECHNICAL FIELD

The described embodiments relate to interactive, wearable computing systems.

BACKGROUND INFORMATION

The advent of mobile computing devices such as smart phones and tablet computers has enabled users to perform computing functions away from their desks and offices. Users operate mobile computing devices while they are walking, driving, etc. However, traditional mobile computing devices employ a fixed display and touch screen command interface. Operating these mobile computing devices while moving can create a dangerous situation as the users hands and eyes should be focused on their mobility task (e.g., walking or driving), rather than operating their mobile computing device.

To reduce the risks associated with operating a mobile computing device while moving, hands-free command interfaces based on voice recognition have been developed. Voice recognition allows the user to operate the mobile computing device while their hands and eyes are focused on more important tasks. However, compared to standard point-and-click operation, voice recognition is slow, unreliable, and limited to a simple, lengthy string of questions. If the user has to listen to a string of selection choices and then speak to the machine, the interface often frustrates the user and is left unused.

Alternative hands-free command interfaces based on tracking eye movement have been explored. Human eyes can move much faster than hands. As a method of pointing, eyes work much faster than a computer mouse, and many orders-of-magnitude faster than voice recognition. However, it is recognized that while eyes can move quickly, the movements are often spontaneous and even erratic. Therefore, eye movements alone are not a reliable command input.

Nonaka introduces an interface to a fixed computer system that combines the simultaneous tracking of the direction of gaze and head gesture as a command input. Additional details are presented in "Communication Interface with Eye-Gaze and Head Gesture Using Successive DP Matching and Fuzzy Inference," by Hidetoshi Nonaka, Journal of Intelligent Information Systems, 21:2, 105-112, 2003, the content of which is incorporated herein by reference in its entirety. The display of the computing system subject to control is fixed in the environment. To resolve a fixed gaze point, the system simultaneously tracks both eye and head movement to identify whether the head and eye movements are coordinated by the vestibulo-ocular reflex (VOR). If VOR is detected, the assumption is that the gaze is fixed and the head gesture is deliberate. In other words, evidence that the user is engaged in a VOR is used as an indicator of a human decision. Although this approach is suitable when the display of the computing system is fixed in the environment, it is unworkable when the display of the computing system subject to control is wearable.

In wearable display systems, a fixed gaze line indicates focus on an object in the environment, rather than an image projected by the display. Thus, detecting the VOR reflex during head movement cannot serve as an effective interface between the user and the wearable display system. Thus, improvements in the interface between a wearable computing system and its user are desired.

SUMMARY

Methods and systems for providing a reliable hands-free interface between a user and a computing device are presented herein. The interface enables the user to express his/her intention by navigating a variety of selection options in a fast, reliable manner. Such a hands-free interface is suitable for controlling wearable computers, phones, robots, and assistive devices.

The interface system includes a gaze tracking system, display system, and head motion tracking system all attached to a frame that is mountable to the head of a user. In one aspect, eye movements are tracked by the gaze tracking system to determine when the gaze of a user has settled on a particular image displayed by the head-mounted display system. After a fixed gaze has been identified, it is determined whether the user is moving his/her head in a confirmatory head gesture.

The user selection is verified by determining whether the gaze of the user remains fixed to the selected image while executing the confirmatory gesture. This is accomplished by determining that the movement of the eye relative to the head of the user remains below a threshold value while the user is executing the confirmatory gesture. This ensures that the gaze of the user is focused on a particular selection option displayed on the head mounted display. Thus, the eye pointing event is verified by discerning whether the user is focused on an image projected by the display or on an object in the surrounding environment during the confirmatory head gesture. To maintain eye focus on the image displayed by the head mounted display while moving the head in a confirmatory gesture requires that the user consciously suspend the vestibulo-ocular reflex (VOR). Hence, when substantially no movement of the eye is detected relative to the moving head, it is a clear indication that the user has consciously decided to suspend his/her VOR reflex for purposes of communicating his/her intent. This physiological switch is both deliberate and detectable, thus minimizing false confirmation events.

The foregoing is a summary and thus contains, by necessity, simplifications, generalizations and omissions of detail. Consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for providing a reliable hands-free interface between a user and a computing device employing a head-mounted display are presented herein. The interface enables the user to express his/her intention by navigating a variety of selection options in a fast, reliable manner. Such a hands-free interface is suitable for controlling wearable computers, phones, robots, and assistive devices.

In one aspect, eye movements are tracked to determine when the gaze of a user has settled on a particular direction. After a fixed gaze direction has been identified, it is determined whether the user is moving his/her head in a confirmatory head gesture. Thus, an eye pointing event is confirmed by a subsequent confirmatory head gesture.

In a further aspect, the user selection is verified by determining whether the gaze of the user remains fixed to a particular portion of the head-mounted display while executing the confirmatory gesture. This is accomplished by determining that the movement of the eye relative to the head of the user remains below a threshold value while the user is executing the confirmatory gesture. This ensures that the gaze of the user is focused on a particular selection option displayed on the head mounted display. In other words, when the eye tracks the image on the head mounted display while the head is moving, the eye does not move relative to the head. This also ensures that the gaze of the user is not focused on an object in the surrounding environment. If the eye is not moving relative to the head while the head is moving, the eye is not tracking an object fixed in the environment. Thus, the eye pointing event is verified by discerning whether the user is focused on an image projected by the display or on an object in the surrounding environment during the confirmatory head gesture.

Moreover, the user must consciously suspend the vestibulo-ocular reflex (VOR) to maintain eye focus on the image displayed by the head mounted display while moving the head in a confirmatory gesture. Hence, when substantially no movement of the eye is detected relative to the moving head, it is a clear indication that the user has consciously decided to suspend his/her VOR reflex for purposes of communicating his/her intent. This physiological switch is both deliberate and detectable, thus minimizing false confirmation events.

Figure 1:
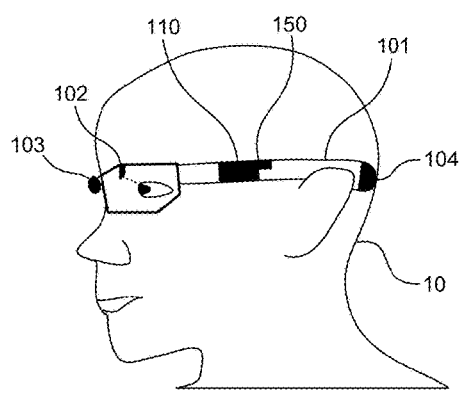
FIG. 1 is a diagram illustrative of a wearable computing device mounted to the head of a user in one embodiment.

FIG. 1 is a diagram illustrative of an embodiment of a wearable computing system mounted to the head of user 10. The wearable computing system includes a gaze tracking system 103, a display system 102, a head motion tracking system 104, computing system 110, and wireless communications system 150 all mounted to a frame 101. Frame 101 is mounted to the head of user 10. In this manner, gaze tracking system 103, display system 102, head motion tracking system 104, computing system 110, and wireless communications system 150 are all fixed in position relative to the head of user 10. In some embodiments, frame 101 is an eye-glass type frame. In some embodiments, the head motion tracking system 104 includes an accelerometer and gyroscopic sensor combination suitable for tracking the motion of the head over time. In some embodiments, the display system is a wearable display system such as Google Glass™.

In one example, gaze tracking system 103 includes an eye-mark recorder system, such as the eye-mark recorder system model number EMR-7 manufactured by NAC Image Technology, Incorporated, Simi Valley, Calif. (USA). In this example, the eye mark recorder includes a head mounted eye-tracking unit and camera controller. Eye movement is measured by an infrared corneal reflex method in the eye tracking unit at a frequency of 30 frames per second. The camera controller embeds the measured data in the vertical blanking period of the NTSC composite video signal of the user's scope image. The measured data are extracted from the composite video signal as 9-bit data for the horizontal direction and 8-bit for the vertical direction, for example, by computing system 110. In one example, head motion tracking system 104 includes a 3D motion tracking system such as the 3D motion tracking system, 3SPACE FASTRAK, manufactured by Polhemus, Incorporated, Colchester, Vt. (USA). In this example, FASTRAK includes a system electronics unit, a transmitter, and a receiver. The motion of the receiver, i.e., the motion of the head, is measured by the system electronics unit based magnetic field measurements. The measured head motion in six degrees of freedom (e.g., x, y, z, Rx, Ry, Rz) is communicated, for example, to computing system 110.

Figure 2:
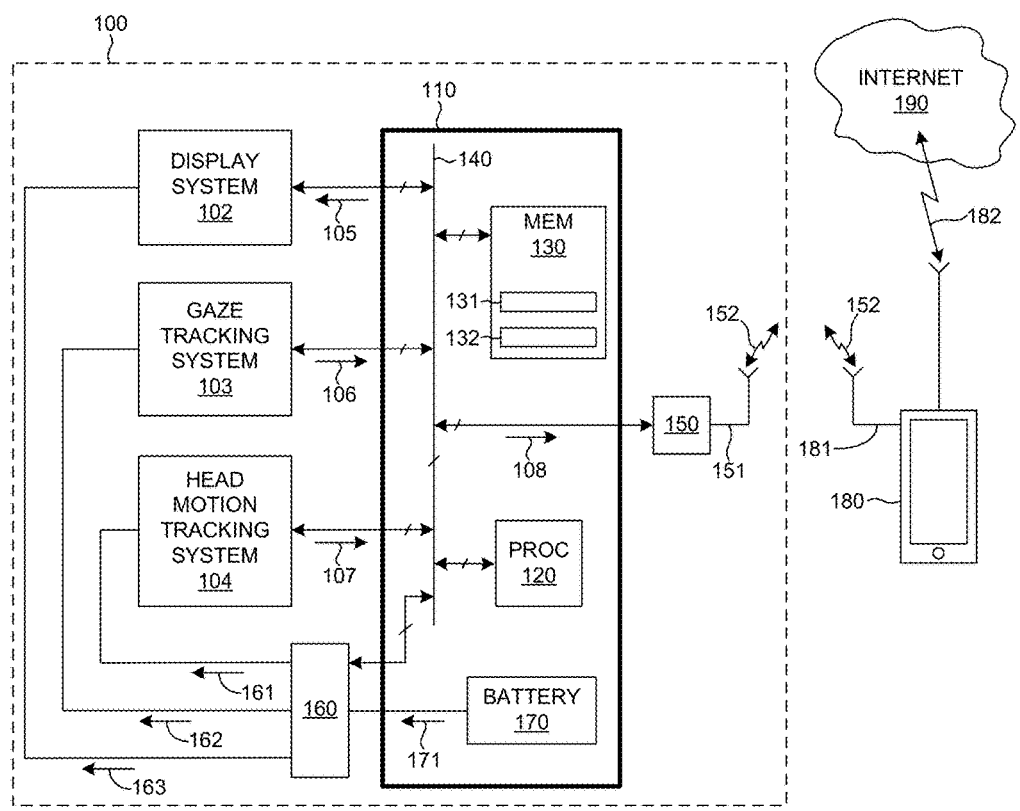
FIG. 2 is a block diagram illustrative of a wearable computing device including a head mountable display, gaze tracking device, and head motion tracking device in one exemplary operational scenario.

FIG. 2 depicts a block diagram illustrative of wearable computing device 100 including a head mountable display 102, a head mountable gaze tracking device 103, and a head mountable head motion tracking device 104, such as those depicted in FIG. 1, in one exemplary operational scenario. Wearable computing device 100 also includes a computing system 110 and wireless communications system 150 that may be head mountable as described with reference to FIG. 1, or alternatively, may be carried by a user, but not head mounted.

Figure 3:
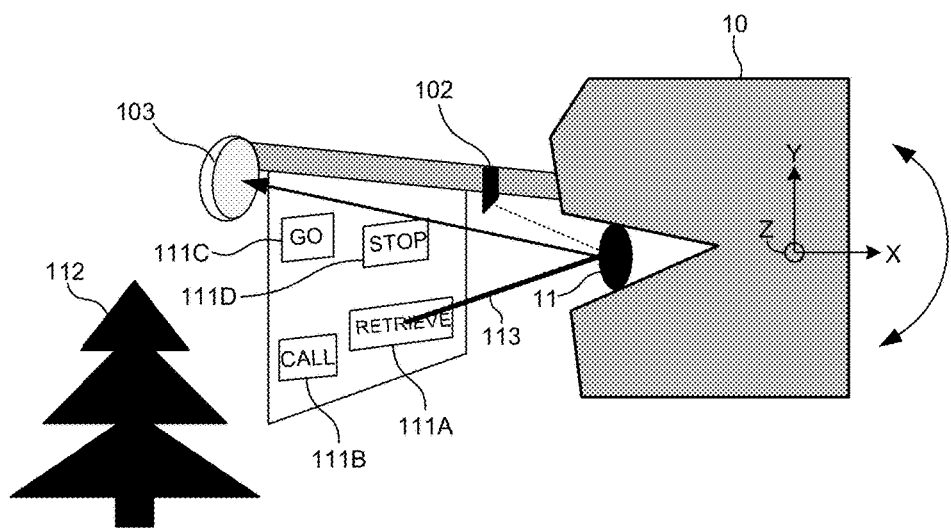
FIG. 3 is a diagram illustrative of the wearable computing device depicted in FIGS. 1-2 in one exemplary operational scenario.

As depicted in FIG. 2, computing system 110 communicates signals 105 to display system 102 that cause display system 102 to present one or more selectable images within the field of view of the user. In general, display system 102 may be any head-mountable display system that displays images within the field of the user such that the images move with the head of the user. In other words, the images remain in the same location with respect to a coordinate frame (e.g., coordinate frame XYZ) attached to the head of the user. As depicted in FIG. 3 in one embodiment, display system 102 projects one or more selectable images 111A-D onto the retina of the eye of a user such that the user perceives the one or more images in the field of view of the user.

Figure 6:
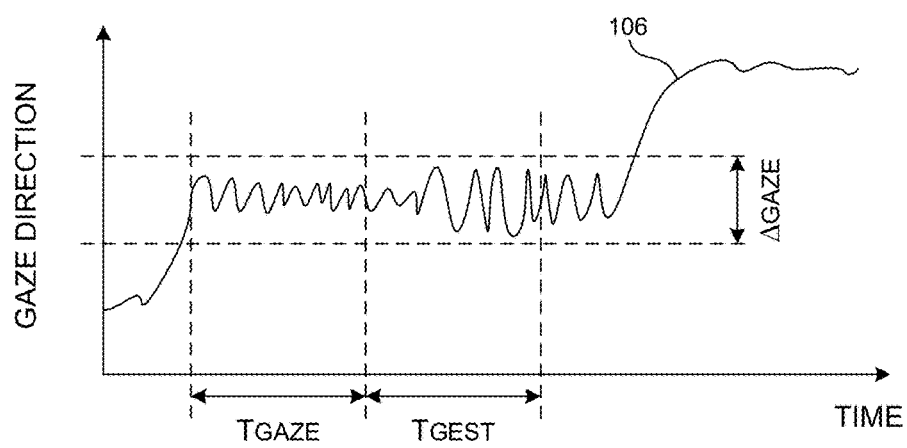
FIG. 6 depicts a representative example of signals 106 indicative of gaze direction over time.

As depicted in FIG. 2, computing system 110 receives signals 106 from gaze tracking system 103 that indicate an amount of movement of an eye of the user relative to the head of the user. Based on these signals, computing system 110 determines whether the gaze of the user is fixed on a selected image for a predetermined period of time. For example, as depicted in FIG. 3, gaze tracking system 103 observes the movement of the eye 11 of the user 10 and generates signals 106 that indicate the direction of gaze 113 of the user at a particular moment in time. FIG. 6 depicts a representative example of signals 106 indicative of gaze direction over time. Computing system 110 determines whether the direction of gaze 113 remains fixed on a particular image 111A within a small tolerance band, ΔGAZE, for a predetermined period of time, TGAZE. TGAZE is selected such that exploratory eye movements can be separated from focused gaze (e.g., a period of time greater than 500 milliseconds). ΔGAZE is selected to allow for signal noise and spurious eye movements that are not indicative of a change of focus of eye gaze.

If computing system 110 determines that the direction of gaze 113 remains fixed on selected image 111A for a period of time, $T_{GAZE}$, the computing system 110 begins to analyze signals 107 received from head motion tracking system 104. Head motion tracking system 104 generates signals 107 that indicate the motion of the head of the user. Computing system 110 determines whether the motion of the head of the user is consistent with a predetermined confirmatory head gesture (e.g., a head nod, a head shake, a head tilt, etc.) based on signals 107 during a period of time after $T_{GAZE}$.

If computing system 110 determines that the motion of the head of the user is consistent with a predetermined confirmatory head gesture, computing system 110 analyzes signals 106 during the period of confirmatory head gesture to verify that the direction of gaze remains fixed on the selected image during the confirmatory head gesture. For example, as depicted in FIG. 6, computing system 110 determines whether the direction of gaze 113 remains fixed on a particular image 111A within a small tolerance band, $\Delta_{GAZE}$, for a predetermined period of time, $T_{GEST}$, after time period, $T_{GAZE}$. In this manner, computing system 110 analyzes signals 106 to verify the confirmatory head gesture for a period of time subsequent to the period of time used to identify that the direction of gaze was originally fixed on a particular image. $\Delta_{GAZE}$ is selected to be a small value that indicates little or no movement of the eye relative to the head. The allowable movement of the eye relative to the head during the confirmatory head gesture is chosen to ensure that the gaze remains fixed on the selected image for the confirmatory time period, $T_{GAZE}$.

Figure 4:
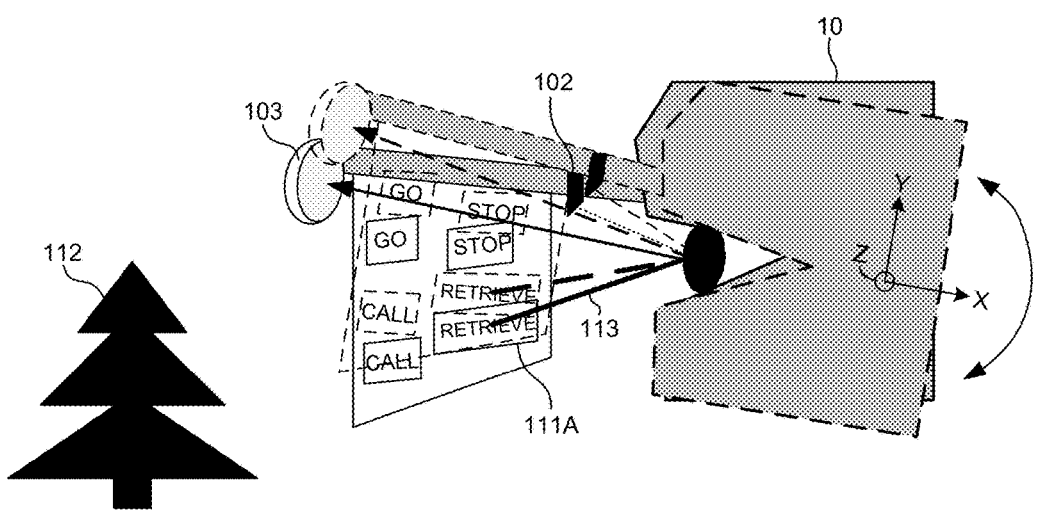
FIG. 4 is a diagram illustrative of an eye tracking a command selection displayed on a head mounted display of the wearable computing device illustrated in FIGS. 1-3.

For example, as depicted in FIG. 4, user 10 executes a confirmatory head gesture by nodding his/her head (i.e., rotating his/her head about the Z-axis of the head-fixed coordinate frame XYZ). Furthermore, the gaze of user 10 remains fixed on selected image 111A during execution of the confirmatory head gesture. In this example, computing system 110 determines that signals 106 indicate movement of the eye 11 relative to the head 10 within tolerance band, $\Delta_{GAZE}$, during the period of time, $T_{GEST}$. In response, computing system 110 executes the command indicated by the image selected by the user (e.g., the "retrieve" command illustrated in FIG. 4). In one example, computing system 110 communicates a message 108 to an external computing device via wireless communications device 150. Message 108 includes a request to "retrieve" information from the external computing system and send the information back to computing system 110 for display to the user.

As depicted in FIG. 4, the display system and gaze tracking system move with the head as the head moves because the head-mounted display is securely fixed to the head. Thus, no movement of the eyes relative to the head is observed by the gaze tracker as long as the gaze of the user remains focused on the selected image 111A.

Figure 5:
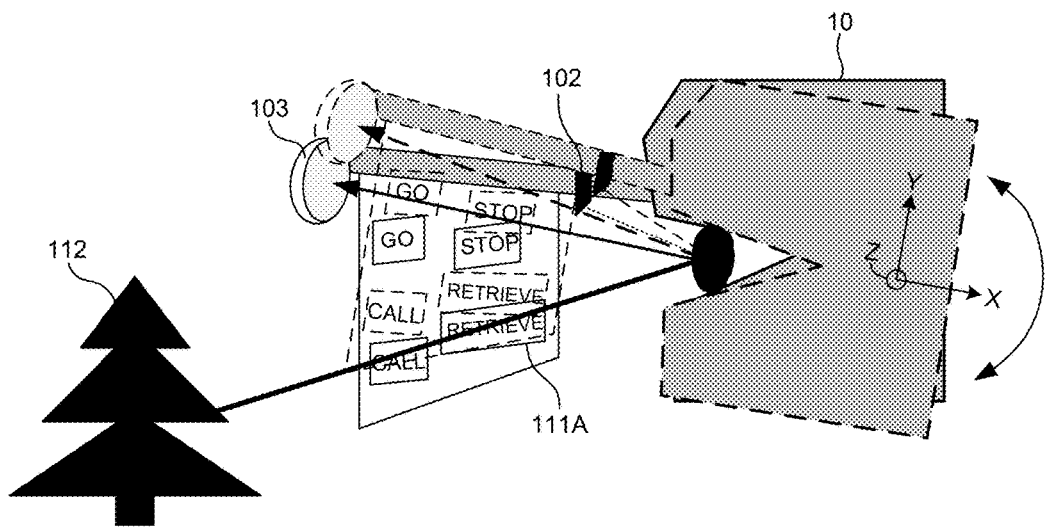
FIG. 5 is a diagram illustrative of an eye tracking an object in the environment while a command selection is displayed on a head mounted display of the wearable computing device illustrated in FIGS. 1-3.

In another example depicted in FIG. 5, user 10 executes a confirmatory head gesture by nodding his/her head (i.e., rotating his/her head about the Z-axis of the head-fixed coordinate frame XYZ). However, the gaze of user 10 remains fixed on image 112 located in the surrounding environment during execution of the confirmatory head gesture. In other words, when the eye of the user is focused on an object in the surrounding environment (i.e., the environment that is not moving with the head) the vestibulo-ocular reflex (VOR) causes the eye to move antagonistically with the head to maintain focus on the object while the head is moving. In this scenario, the eye moves with respect to the head to maintain the direction of gaze on the object. In this example, computing system 110 determines that signals 106 indicate movement of the eye 11 relative to the head 10 that is outside tolerance band, $\Delta_{GAZE}$, during the period of time, $T_{GEST}$. In response, computing system 110 does not execute any command indicated by any of the images presented to the user by display system 102.

Computing system 110 is communicatively coupled to the head mounted display 102, gaze tracking device 103, and head motion tracking device 104 by a wired, or wireless communications link. In addition, computing system 110 is communicatively coupled to a wireless communications device 150 by a wired communications link. In turn, wireless communication device 150 is operable to maintain a wireless communication link with an external computing device with access to a network such as a local area network, wide area network, the internet, etc. In the example depicted in FIG. 2, wireless communications device 150 maintains a wireless communications link operating in compliance with any suitable wireless communications protocol (e.g., Bluetooth®, WiFi, ZigBee®, any cellular network based protocol, or other high frequency communications network).

In one embodiment, wireless communications device 150 is operable to maintain a wireless communication link with an external computing device (e.g., router) within a network such as a local area network, wide area network, the internet, etc. In this example, wireless communications device 150 maintains a wireless communications link with a network communications device such that data (e.g., message 108) may be communicated between computing system 110 and the network.

In another embodiment depicted in FIG. 2, wireless communications system 150 is configured to communicate digital signals from computing system 110 to a portable computing device 180. As depicted in FIG. 2, wireless communications system 150 transmits a radio frequency signal 152 over antenna 151. The radio frequency signal 152 includes digital information indicative of the digital signals (e.g., message 108) to be communicated from computing system 101 to the portable computing device 180. The radio frequency signal 152 is received by wireless communications device 180 over antenna 181.

As depicted in FIG. 2, by way of non-limiting example, portable computing device 180 is an internet enabled electronic device that is further configured to communicate the digital signals to another computing system (not shown) that is communicatively coupled to device 180 over the internet 190. In some other examples, portable computing device 180 is a network enabled electronic device that is further configured to communicate the digital signals to another computing system (not shown) that is communicatively coupled to device 180 over a local area network.

In a further aspect, computing system is configured to control the supply of electrical power to one or more of the head mounted display 102, gaze tracking device 103, and head motion tracking device 104. As depicted in FIG. 2, computing system 110 includes a battery 170 that supplies power to electronic components of computing system 110. However, battery 170 is also configured to supply electrical power 171 to power supply 160. Power supply 160 is configured supply electrical power signals to the head mounted display 102, gaze tracking device 103, and head motion tracking device 104. For example, power supply 160 supplies electrical power signal 163 to head mounted display 102, electrical power signal 162 to gaze tracking device 103, and electrical power signal 161 to head motion tracking device 104. Power supply 160 is attached to bus 140 and is controlled by processor 120. Processor 120 is configured to detect the power supply requirements (if any) of each attached system and configure power supply 160 to supply appropriate electrical power signals.

As depicted in FIG. 2, computing system 101 includes a processor 120, a memory 130, and a bus 140. Processor 120 and memory 130 are configured to communicate over bus 140. Memory 130 includes an amount of memory 131 that stores data collected from gaze tracking system 103 and head motion tracking system 104, along with threshold values such as $T_{GAZE}$, $T_{GEST}$, and $\Delta_{GEST}$ as described hereinbefore. Memory 130 also includes an amount of memory 132 that stores program code that, when executed by processor 120, causes processor 120 to implement hands-free interface functionality as described herein.

In some examples, processor 120 is configured to store the digital signals generated by gaze tracking device 103 and head motion tracking device 104 onto memory 131. In addition, processor 120 is configured to read digital signals stored on memory 131 and transmit the digital signals to display system 102, wireless communication transceiver 150, and programmable power supply 160.

Figure 7:
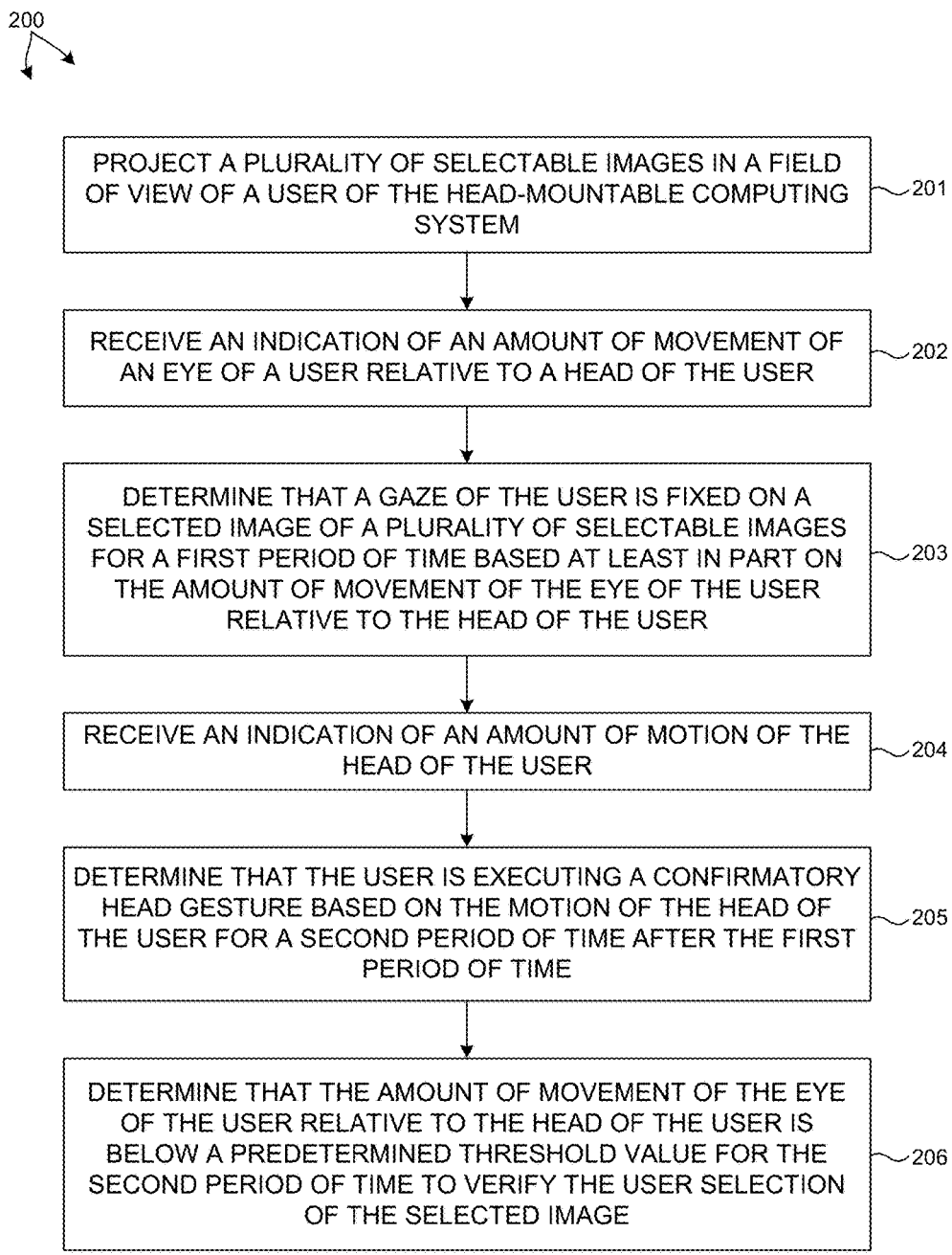
FIG. 7 is a flowchart illustrative of one exemplary method 200 of interfacing a user and a wearable computing device.

FIG. 7 illustrates a flowchart of a method 200 implementing hands-free interface functionality as described herein. In some embodiments, wearable computing system 100 is operable in accordance with method 200 illustrated in FIG. 7. However, in general, the execution of method 200 is not limited to the embodiments of wearable computing system 100 described with reference to FIG. 2. This illustration and corresponding explanation are provided by way of example as many other embodiments and operational examples may be contemplated.

In block 201, a plurality of selectable images 111A-D are projected in a field of view of a user 10 of a head-mountable computing system 100.

In block 202, an indication (e.g., signals 106) of an amount of movement of an eye 11 of a user 10 relative to a head of the user is received by computing system 110.

In block 203, a gaze of the user 10 is determined to be fixed on a selected image 111A of a plurality of selectable images 111A-D for a first period of time, $T_{GAZE}$, based at least in part on the amount of movement of the eye 11 of the user 10 relative to the head of the user.

In block 204, an indication (e.g., signals 107) of an amount of motion of the head of the user 10 is received by computing system 110.

In block 205, the user 10 is determined to be executing a confirmatory head gesture based on the motion of the head of the user for a second period of time, $T_{GEST}$, after the first period of time, $T_{GAZE}$.

In block 206, the user selection of the selected image is verified by determining that the amount of movement of the eye 11 of the user 10 relative to the head of the user 10 is below a predetermined threshold value, $\Delta_{GEST}$, for the second period of time, $T_{GEST}$.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:
1. A head-mountable eye-pointing system, comprising:
a display device configured to generate one or more selectable images in a field of view of the user;
a gaze tracking device configured to generate signals indicative of an amount of movement of an eye of the user relative to the head of the user;
a head motion tracking device configured to generate signals indicative of an amount of motion of the head of the user; and
a computing system communicatively coupled to the display device, the gaze tracking device and the head motion tracking device, wherein the computing system is configured to:
receive the signals indicative of the amount of movement of the eye of the user relative to the head of the user;
determine that the gaze of the user is fixed on a selected image of the plurality of selectable images for a first period of time based at least in part on the amount of movement of the eye of the user relative to the head of the user;
receive the signals indicative of the amount of motion of the head of the user;
determine that the user is executing a confirmatory head gesture based on the motion of the head of the user for a second period of time after the first period of time; and determine that the amount of movement of the eye of the user relative to the head of the user is below a predetermined threshold value for the second period of time to verify the user selection of the selected image.

2. The head-mountable eye-pointing system of claim 1, further comprising:
a frame configured to be removably coupled to a head of a user, wherein the display device, the head motion tracking device, and the gaze tracking device are coupled to the frame.

3. The head-mountable eye-pointing system of claim 1, further comprising:
a wireless transceiver configured to communicate an indication of the user selected image to an external computing system.

4. The head-mountable computing system of claim 3, wherein the wireless transceiver is further configured to receive a response to the indication of the user selected image from the external computing system that includes an indication of one or more images to be displayed by the display device in the field of view of the user.

5. The head-mountable eye-pointing system of claim 3, wherein the external computing system is any of a mobile computing device, a personal computer, a router, and a server.

6. The head-mountable eye-pointing system of claim 1, wherein the determining that the gaze of the user is fixed on the selected image of the plurality of selectable images involves determining that the amount of movement of the eye of the user relative to the head of the user is below a predetermined threshold value for the first period of time.

7. The head-mountable eye-pointing system of claim 1, wherein the display device projects the one or more selectable images onto the retina of the eye of the user such that the user perceives the one or more images in the field of view of the user.

8. The head-mountable eye-pointing system of claim 1, wherein a location of the one or more selectable images in the field of view of the user is fixed relative to the head of the user.

9. The head-mountable eye-pointing system of claim 1, wherein the confirmatory head gesture is a head nod.

10. The head-mountable eye-pointing system of claim 1, further comprising:
a battery; and
a programmable power supply coupled to the battery and the display device, the gaze tracking device, and the head motion tracking device, wherein the programmable power supply is configured to receive electrical power from the battery and supply electrical power to the display device, the gaze tracking device, and the head motion tracking device based on one or more signals received from the computing system.

11. A method of selecting user commands for a head-mountable eye-pointing system comprising:
projecting a plurality of selectable images in a field of view of a user of the head-mountable computing system;
receiving an indication of an amount of movement of an eye of a user relative to a head of the user;
determining that a gaze of the user is fixed on a selected image of a plurality of selectable images for a first period of time based at least in part on the amount of movement of the eye of the user relative to the head of the user;
receiving an indication of an amount of motion of the head of the user;
determining that the user is executing a confirmatory head gesture based on the motion of the head of the user for a second period of time after the first period of time; and
determining that the amount of movement of the eye of the user relative to the head of the user is below a predetermined threshold value for the second period of time to verify the user selection of the selected image.

12. The method of selecting user commands for a head-mountable eye-pointing system of claim 11, further comprising:
communicating an indication of the user selected image to an external computing system.

13. The method of selecting user commands for a head-mountable eye-pointing system of claim 11, wherein the determining that the gaze of the user is fixed on the selected image of the plurality of selectable images involves determining that the amount of movement of the eye of the user relative to the head of the user is below a predetermined threshold value for the first period of time.

14. The method of selecting user commands for a head-mountable eye-pointing system of claim 11, wherein the projecting the plurality of selectable images involves projecting the one or more selectable images onto the retina of the eye of the user such that the user perceives the one or more images in the field of view of the user.

15. The method of selecting user commands for a head-mountable eye-pointing system of claim 11, wherein a location of the one or more selectable images in the field of view of the user is fixed relative to the head of the user.

16. The method of selecting user commands for a head-mountable eye-pointing system of claim 12, further comprising:
receiving a response to the indication of the user selected image from the external computing system that includes an indication of one or more images to be displayed by the display device in the field of view of the user.

17. A system comprising:
a head-mountable display system configured to project a plurality of selectable images in a field of view of a user; and
a non-transitory, computer-readable medium, comprising:
code for causing a computer to receive an indication of an amount of movement of an eye of a user relative to a head of the user;
code for causing the computer to determine that a gaze of the user is fixed on a selected image of a plurality of selectable images for a first period of time based at least in part on the amount of movement of the eye of the user relative to the head of the user;
code for causing the computer to receive an indication of an amount of motion of the head of the user;
code for causing the computer to determine that the user is executing a confirmatory head gesture based on the motion of the head of the user for a second period of time after the first period of time; and
code for causing the computer to determine that the amount of movement of the eye of the user relative to the head of the user is below a predetermined threshold value for the second period of time to verify the user selection of the selected image.

18. The system of claim 17, further comprising:
a wireless transceiver configured to communicate an indication of the user selected image to an external computing system.

19. The system of claim 17, wherein the determining that the gaze of the user is fixed on the selected image of the plurality of selectable images involves determining that the amount of movement of the eye of the user relative to the head of the user is below a predetermined threshold value for the first period of time.

20. The system of claim 17, wherein a location of the one or more selectable images in the field of view of the user is fixed relative to the head of the user.

* * * * *